United States Patent [19]
Staron

[11] Patent Number: 5,555,463
[45] Date of Patent: Sep. 10, 1996

[54] TELEVISION RECEIVER WITH DEFERRED TRANSMISSION OF MOVING IMAGE SEQUENCES

[75] Inventor: Alain Staron, Paris, France

[73] Assignee: Thomson Consumer Electronics, Courbevoie, France

[21] Appl. No.: 290,781

[22] PCT Filed: Jan. 25, 1994

[86] PCT No.: PCT/FR94/00087

§ 371 Date: Aug. 30, 1994

§ 102(e) Date: Aug. 30, 1994

[87] PCT Pub. No.: WO94/17626

PCT Pub. Date: Aug. 4, 1994

[30] Foreign Application Priority Data

Jan. 26, 1993 [FR] France ................................. 93 00728

[51] Int. Cl.⁶ ................................ H04N 5/44; H04N 9/79; H04N 5/76
[52] U.S. Cl. ................... 348/560; 348/715; 348/718; 358/311; 358/335; 360/14.1; 360/33.1
[58] Field of Search ......................... 348/559, 560, 348/714, 715, 716, 717, 718, 719; 358/908, 311, 312, 313, 335; 360/13, 14.1, 11; H04N 9/12, 9/79, 5/44, 5/76

[56] References Cited

U.S. PATENT DOCUMENTS 4,891,715  1/1990  Levy .................... 358/311 X
5,134,499  7/1992  Sata et al. .
5,371,551  12/1994  Logan et al. .................... 348/714 X

FOREIGN PATENT DOCUMENTS 1279549  8/1988  European Pat. Off. .
2222742  3/1990  United Kingdom .

OTHER PUBLICATIONS

Symposium Record, Broadcast sessions; pp. 289–295, Jun. 17–22, 1989, D. J. Woodham, "A Solid State 'Action Replay' Recorder".

IEEE Transactions On Communications, vol. Com–26, No. 5, pp. 594–600, May 5, 1978, Robert Johnston, et al., "A Digital Television Sequence Store".

Primary Examiner—Victor R. Kostak
Assistant Examiner—John W. Miller
Attorney, Agent, or Firm—Oblon, Spivak, McClelland, Maier & Neustadt, P.C.

[57] ABSTRACT

A television receiver equipped with an internal device produces a deferred source signal in order to alter the amount (X) of deferment in order to allow for a replay or skipping of a portion of a program being viewed. The change in deferment is followed automatically by a resumption of the initial value of deferment. This allows for instant replay or fast forward and subsequent return to the initial condition in an automatic manner.

13 Claims, 3 Drawing Sheets

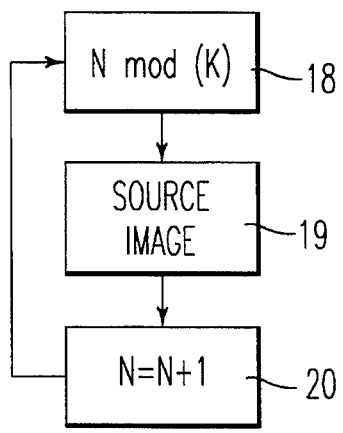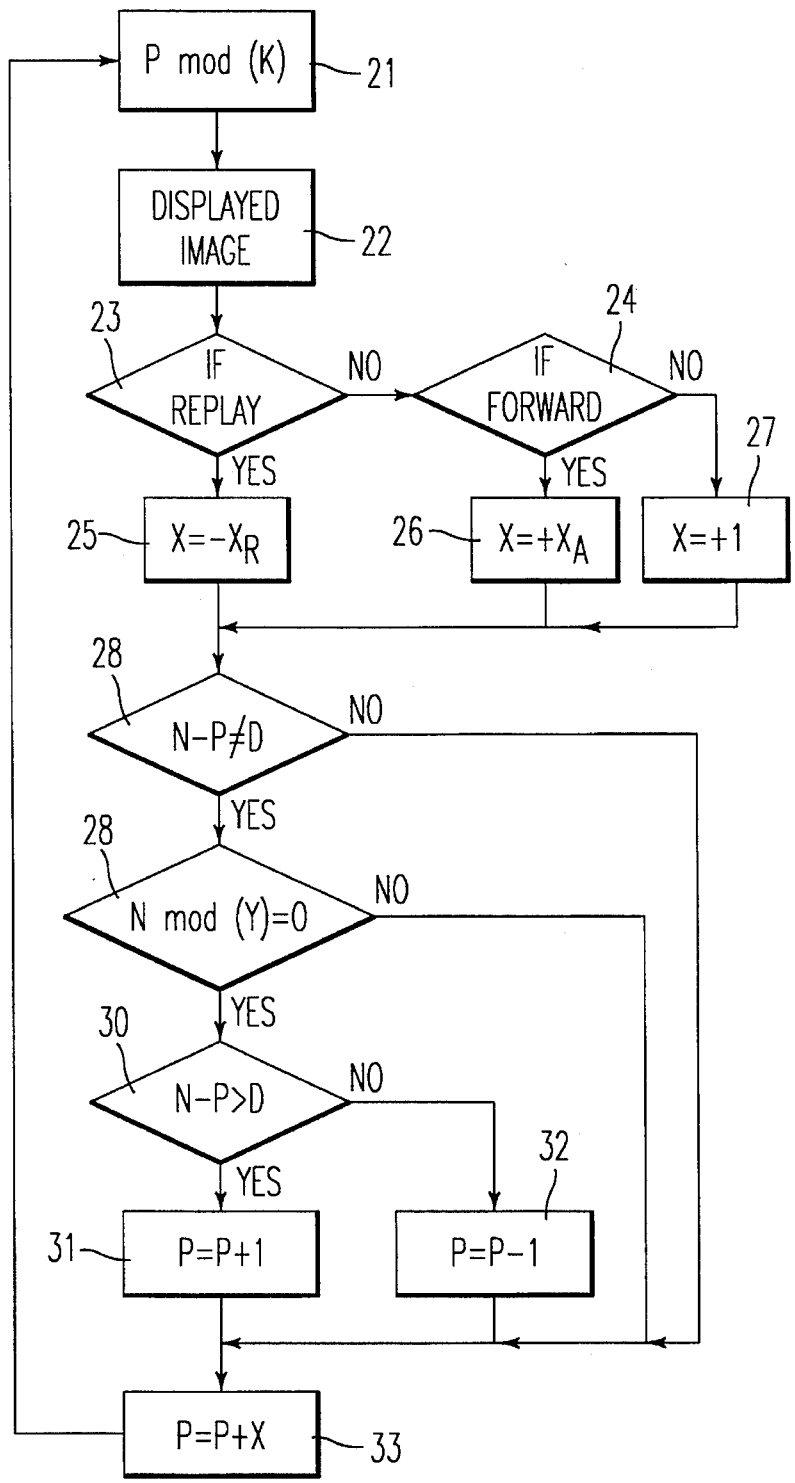

TELEVISION RECEIVER WITH DEFERRED TRANSMISSION OF MOVING IMAGE SEQUENCES

BACKGROUND OF THE INVENTION

The present invention relates to television receivers. When a sequence of moving images is viewed on the screen of a television receiver, the signals received are applied directly to the viewing means. In this way, the television viewer is constrained by the screening of the program received and if he wishes to intervene in this screening, he can merely change program. When using a video recorder it is possible to replay a snippet of the programme recorded on the magnetic tape or to jump over a snippet deemed to be of no interest. These functions are obtained by modification of the conditions of paying out of the magnetic tape past the magnetic heads. When it is not desired to employ a video recorder to obtain these functions, it is necessary to provide, inside the television set, means making it possible to defer over time the playing of the images constituting the signal received. Indeed, the replaying of a snippet assumes that its content is preserved for a certain time in the receiver and jumping over a snippet is conceivable only as the reducing of a deferred processing of the signals from the tuner or from the television peripheral socket. It is therefore seen that the television set must be equipped with a buffer memory capable of stocking a large number of images and with an addressing control allowing the simulation of a jump in time bearing upon a group of images and the imperceptible automatic recovery of the preexisting playing conditions.

SUMMARY OF THE INVENTION

The subject of the invention is therefore a television receiver comprising means for obtaining a source signal representative of a sequence of moving images and display means allowing the viewing of the said sequence, characterized in that it includes internal means enabling the said source signal to be applied under deferment to the said display means; the said deferment undergoing a change of value on request and automatically resuming its initial value in order to satisfy a subsequent request; the said deferment being produced by a buffer memory having a capacity of several images.

The subject of the invention is also a device including means for the deferred transmission of a sequence of moving images via a buffer memory associated with write and read addressing means, the said deferment undergoing an abrupt change of value on request and automatically resuming its initial value in order to satisfy a subsequent request, the said buffer memory having a sufficient capacity to contain several images of the said sequence, characterized in that the said abrupt change of value is by choice positive or negative, so as to offer the possibility of repeating and that of skipping a portion of the said sequence.

BRIEF DESCRIPTION OF THE DRAWINGS

The invention will be better understood by means of the description below and the appended Figures, in which:

FIG. 4 is a flow chart specifying the operating procedures for a system for managing the addresses of the buffer memory illustrated in the earlier Figures.

DETAILED DESCRIPTION OF THE PREFERRED EMBODIMENTS

Figure 1A:
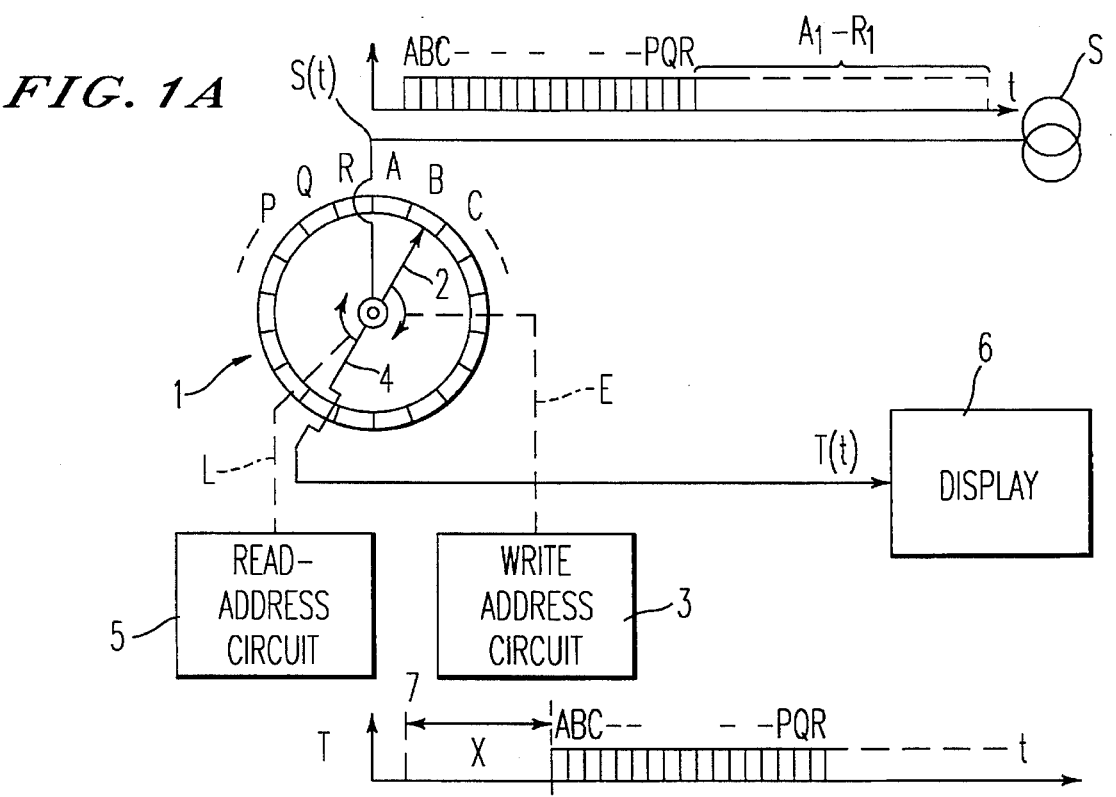
FIG. 1 shows diagrammatically the internal means of a television receiver according to the invention and their application to the function which allows the skipping of a group of images.
Figure 1B:
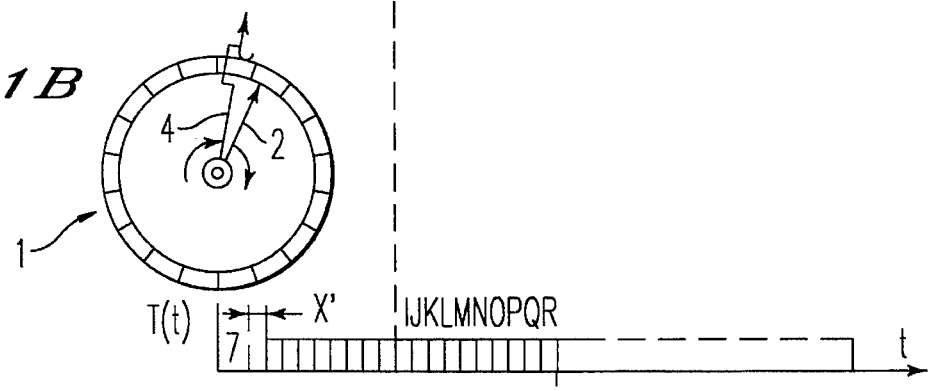
Figure 1C:
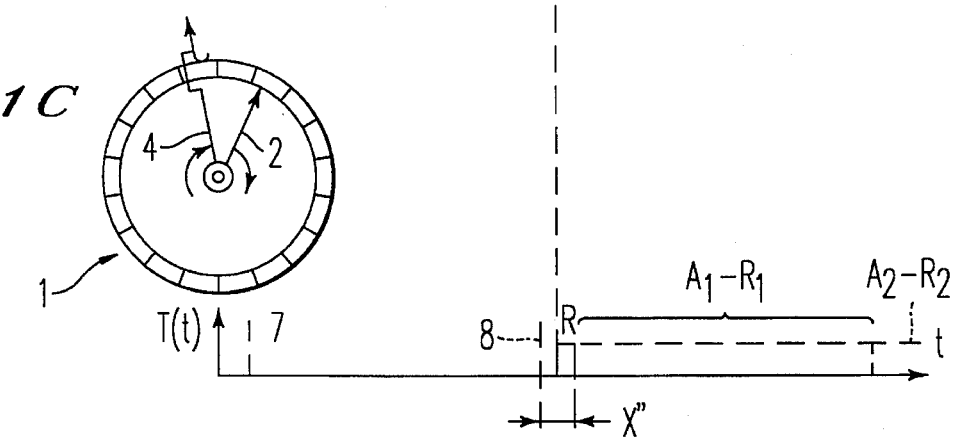

In FIG. 1 can be seen, under (a), a memory 1 capable of storing a sequence of moving images originating from a source S. This memory includes N areas assigned to the storing of the images A, B, C, . . . PQR and in order to better illustrate the cyclic operation, these areas are arranged as a closed loop. The signal S(t) to be written to the memory 1 includes a string of N images A, B, C, . . . , PQR, followed by another string $A_1$–$R_1$. In order to portray the write function, an arm 2 has been represented which effects the loading of the signal S(t) into the areas of the memory 1. This arm turns in the clockwise direction, addressing a new area with each new image. The control of the arm 2 depends on an area address supplied via a write line E by a write-addressing circuit 3. In FIG. 1, under (a), it has been assumed that the sequence A, B, C, . . . , P, Q, R began to be loaded when the arm 2 was pointing to the top, the precise instant of the start of this loading being denoted 7 in the time charts of FIG. 1. The reading of the memory 1 is portrayed by another arm 4 also turning in the clockwise direction, but which is delayed relative to the arm 2. In FIG. 1, under (a) the shift is half a revolution. Read-addressing is portrayed by a line L connected to a read-addressing circuit 5. Reading gives rise to a signal T(t) which is a sequence of images A, B, C, . . . , P, Q, R like that of the signal S(t), but whose restoration starts X image intervals after the instant labelled 7. The read signal T(t) is applied to the display means 6 of a television set furnished with the memory 1 and with the means producing the source signal S(t). The phase of normal operation is assumed to correspond to the maintaining of this shift of X image intervals.

In accordance with the foregoing, it is seen that the memory is refreshed after each complete rotation of the arm 2. When the time shift between reading and writing is constant and does not exceed the refresh period, a delayed programme is observed on the screen of the television set, since the images were output by the source S before being displayed.

The user of the television set may wish to skip a snippet of the programme, as occurs with a video recorder when the fast forward control is operated. This fast forward facility makes it possible to close up in time two programme segments separated for example by an advertising slot, this slot being wholly eliminated if the closing up is sudden and if the jump has the appropriate amplitude. This facility is illustrated under (b) in FIG. 1 where it is seen that the reader arm 4 has been advanced towards the write arm 2 in order to shorten the interval separating reading from writing. The interval goes from X to X' at the moment at which the reading of the sequence A, B, C, . . . , P, Q, R started, so that the images A to H are read at a speeded-up rate or are purely and simply skipped if the snippet is instantaneous, as assumed in FIG. 1 under (b). This second phase of operation illustrates a first aspect of the invention.

A second aspect of the invention consists in automatically and gradually recovering the initial conditions, that is to say the delay X, after having used the fast forward control. It is therefore assumed that what remains of the sequence A, B, C, ..., P, Q, R has been displayed and that at the instant 8, the loading of the sequence $A_1-R_1$ is begun. It is seen under (c) in FIG. 1 that the shift between the area loaded and the area read is increased by one unit. This involves a duplicating of the reading of image R which is immediately followed by the reading of the sequence $A_1-R_1$. It is noted that the delay of the written sequence relative to the read sequence has become X"=X'+1. When reading the sequence $A_2-R_2$, the image $R_1$ will be duplicated, this having the effect of taking the delay to X"+1. After a certain time, the delay X is retrieved, this terminating the recovery phase and allowing reuse of the fast forward control.

starting from the initial situation illustrated under (a) in FIG. 1, it may be wished to review a snippet of the programme which has just been displayed on the screen of the television set. This facility, likewise offered by video recorders, corresponds to the instant replay control. It is obtained with the system of FIG. 1 by increasing the delay of the arm 4 relative to the arm 2. This constitutes a third aspect of the invention which is illustrated by FIG. 2.

Figure 2B:
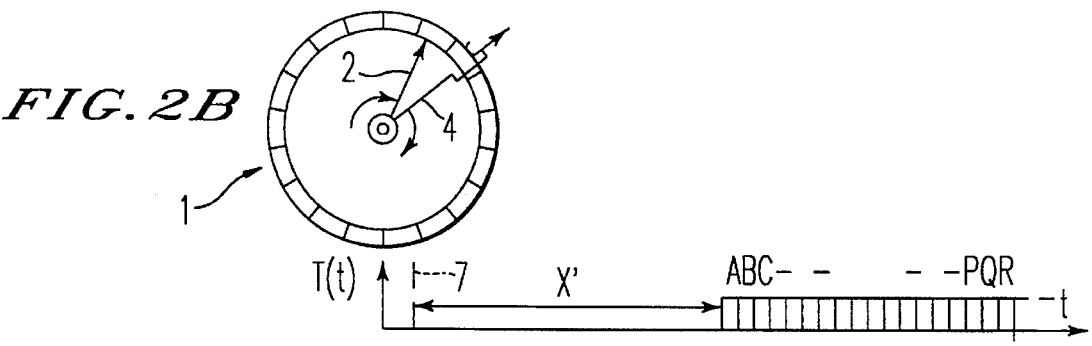
FIG. 2 represents the means of FIG. 1, applied to the replay function.
Figure 2A:
Figure 2C:
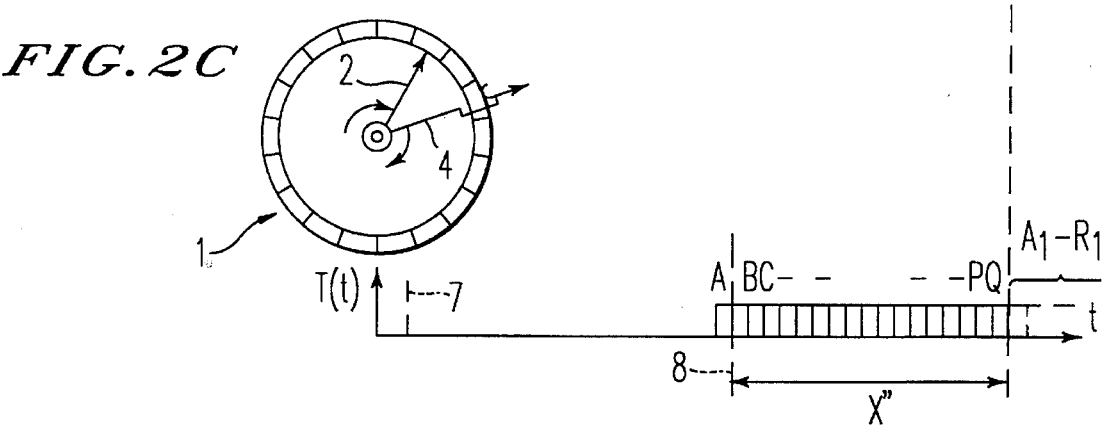

In FIG. 2, under (a) is again the situation corresponding to part (a) of FIG. 1. Under (b), in FIG. 2, it is seen that the read arm 4 has pivoted in the counterclockwise direction so as to come just beside the arm 2. By virtue of this displacement, the read signal acknowledges a larger delay X. If this change takes place abruptly when the image H was displayed, it is noted under (b) that the following image is again A. It is therefore possible to view the snippet containing images A to H again.

According to a fourth aspect of the invention, after having performed an instant replay, it is necessary to return gradually to the initial situation. During a second write cycle starting at the instant 8 in the detail (c) of FIG. 2, arrangements are made to obtain a read delay whose value X" is one unit less than X'. The difference between the read signal T(t) represented under (a) and under (c) lies in the skipping of the image R, so that the following sequence $A_1-Q_1$ is read immediately after image Q. This removal of one image will be repeated cycle after cycle, so as to return the delay to its initial value X.

When confining oneself to one of the two controls, fast forward and instant replay, the initial state of the arm 4 can be situated just after, or just before the start-write-position of the arm 2. In FIGS. 1 and 2 the two possibilities have been provided for, but the choice could be offered between making provision for both controls or having access to only one of them with a doubled delay amplitude.

Figure 3:
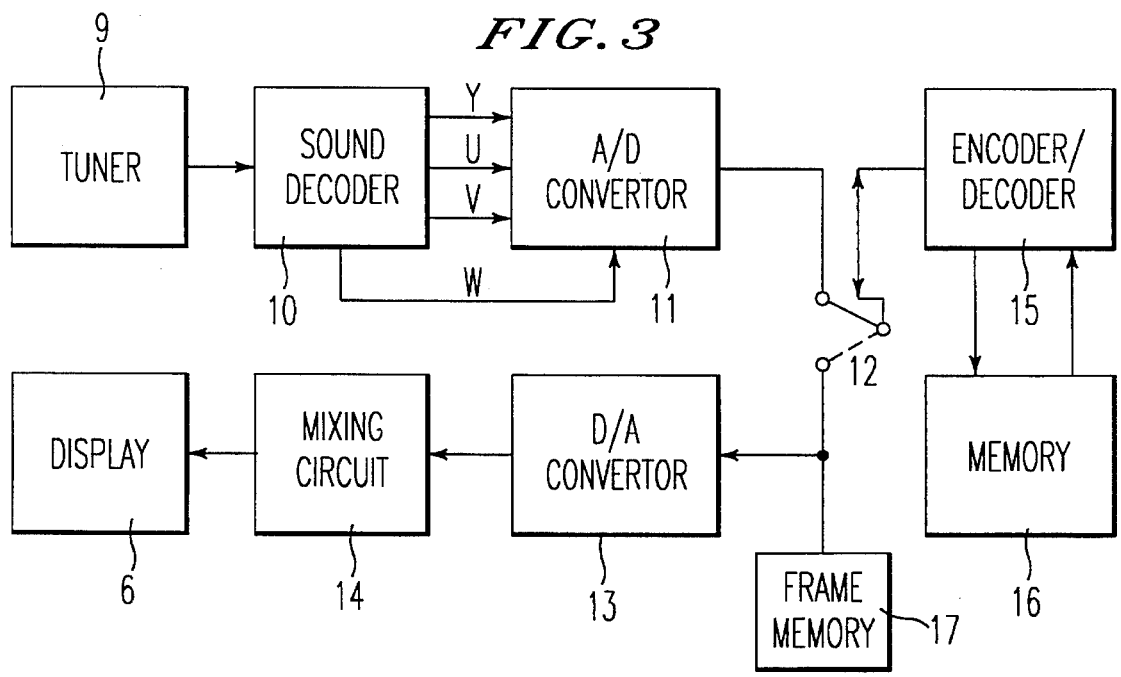
FIG. 3 is a diagram of a television receiver equipped with a buffer memory and with means for compressing/expanding the images to be loaded and extracted from the said memory.

In the foregoing description, the manner of cooperation of a signal source S, a buffer memory 1, control circuits 3 and 5 and display means 6 was indicated. What is true for the image applies also to the accompanying sound which may be associated with the video signal through sampling, quantization and time-division multiplexing. A television set implementing the invention is composed of the means illustrated in FIG. 3.

The audio/video signals are produced by a tuner 9 or obtained from a television peripheral socket. A colour and sound decoding circuit 10 processes these signals and delivers image components Y, U, V with which is associated a sound signal W. These signals are applied to an analog/digital converter 11 which quantizes and multiplexes them. The sampled and multiplexed sound signal is addressed to a dedicated memory for the purpose of running a deferred reading process as described above. The digital video signals leaving the converter 11 are conveyed onto one of the paths of a switch 12 which assigns them to an encoder/decoder circuit 15 which carries out compression and expansion operations making it possible to obtain bit-rates of 1 to 15 Mbits/s for the purpose of storing the images in a memory 16 which combines together the means 1, 3 and 5 described earlier. This memory can have an extendable capacity achieved by adding modules which take the form of for example microchip cards. The other path of the switch 12 is connected on the one hand to a frame memory 17 and to the input of a digital/analog converter 13. The output of the converter 13 is connected to the input of a RGB matrixing circuit 14 which feeds the display means 6. In the example shown diagrammatically in FIG. 3, the encoder/decoder 15 is a JPEG-MPEG processor (intra-image compression, MPEG compatible) working in half-duplex mode at a speed of 15 images/s. The switch 12 switches at 30 Hz or at 25 Hz depending on the television standard envisaged. In this embodiment, the frame memory is reread twice to avoid flicker. Without deviating from the field of the invention, it is also possible to envisage full-duplex operation. In this case, the diagram of FIG. 3 no longer includes a switch 12 and a simple encoder is used, with the label 15. A decoder must be added between the memory 16 and the digital/analog converter 13.

Implementation of deferred reading with adjustable time shift, such as it has been described, can be based on a semiconductor memory containing for example four 16-Mbits chips so as to produce time jumps of the order of one minute.

Without deviating from the field of the invention, it is possible to envisage using a magnetic memory including for example an endless tape associated with air-gap write and read heads. The length of tape separating these heads can be modified to produce the functions alluded to above, this amounting to making provision for an internal video recorder having a short tape in a closed loop and a special tape transport mechanism. In such an eventuality, it is not necessary to digitize the information to be written to the tape.

It is also possible to envisage placing, inside the television receiver, a magneto-optical disk recorder/reader furnished with independent read and write heads, so as to position the read head anywhere inside that region of the disk used by the write head to store in binary form a moving image sequence. When adopting a disk with constant angular velocity and a recording of one image per revolution, it is possible, through sizeable radial displacements, rapidly to vary the deferment of reading and by means of track-to-track jumps return it to its initial value. A hard disk of the sort used in computing can also be envisaged as buffer memory, on condition that independent heads are provided for writing and reading the data.

To carry out deferred reading bearing upon a large number of images, it is necessary to adopt an appropriate coding so that the buffer memory should store each image in the form of a compressed signal. The image restored after decoding is normally of lesser quality than the original image. It is therefore advantageous to produce a buffer memory device which preserves a number of images in order to review a snippet of a moving image sequence, but which, in normal times, does not follow the delayed path. In this variant embodiment, the signal S(t) is transmitted directly to the display device 6 so as to preserve the best possible image quality. It is only when the instant replay mode is present that the display device is switched to the buffer memory 1. In the fast forward mode, use is normally made of the contents of the buffer memory, so that the image quality is tied to the compression/expansion process. The user will be able to adopt a compromise between image quality and the amount of the deferment by virtue of a control fixing the compression factor and hence the extent of the memory area assigned to each image.

The flowcharts (a) and (b) of FIG. 4 illustrate the main steps of the process to be implemented for the microprocessor management of the buffer memory 1. It is assumed that this buffer memory is capable of storing K images, the deferment initially taking the value D which represents the number of images between the write address and the read address; D will, for example, be close to half the capacity K/2. The instant replay function will bear at most upon Q successive images and the fast forward function upon R successive images. The write addresses are obtained from a variable N. Under (a) in FIG. 4 it is seen that, starting from the initial condition N=D and P=0, P being the read address, the operation in box 18 is performed, that is to say N modulo(K) to obtain the write address of the first image. Box 19 indicates the loading at this address of the source image and box 20 undertakes the incrementation of N. Alongside, the process illustrated under (b) indicates the processing applied to the read address. When under the conditions of reading without calling upon the "replay" or "fast forward" functions, the contents of box 21, box 22, box 27 and box 33 are performed. This amounts to calculating the read address, extracting the image at this address so as to display it and incrementing P by one unit. The conditional branches 23, 24 and 28 are made with the "NO" response. Simultaneous incrementation of the write and read addresses maintains a difference N-P equal to D.

If replay is instructed, the conditional branch 23 instructs the operation $X=-X_R$, where X is a system variable found again in box 33. The value $-X_R$ is equal to at most Q. The read address is changed starting from the next cycle of the process, and this will cause a conditional branch from box 28 to box 29 and, if the variable N modulo(Y) is zero, a branch from 29 to 30 so as to execute the operation in box 31 or 32 which increments or decrements P. By virtue of this phase of operation, the change of read address which occurred will be swallowed up imperceptibly at a rate of a shift of one image every Y images.

Operation of the same sort applies in the case of a fast forward, but it involves the branch to box 26 which takes X to the value $+X_A$ with upper bound R. The conditional branch 30 selects incrementation or decrementation, so as to swallow up the shift of the read addresses and retrieve a shift D without one being aware of the insertion or removal of an image in the moving image sequence.

It goes without saying that the determination of the write and read addresses could be done with hard-wired logic, especially by means of appropriate address counters.

I claim:

1. Device including means for the deferred transmission of a sequence of moving images via a buffer memory associated with write and read addressing means, said deferment undergoing an abrupt change of value on request and automatically resuming its initial value in order to satisfy a subsequent request, said buffer memory having a sufficient capacity to contain several images of the said sequence, characterized in that the said abrupt change of value is by choice positive or negative, so as to offer the possibility of repeating and that of skipping a portion of the said sequence.

2. Device according to claim 1, characterized in that said deferred transmission means comprise: a writable and erasable information medium, means effecting the paying out of the said medium past a recording head and past a read head and means for displacing the said read head, in order to modify its position within that region of the said medium scanned by the said recording head.

3. Device according to claim 2, characterized in that said information medium includes a magnetic recording material.

4. Device according to claim 2, characterized in that means are provided for digitizing said source signal prior to its writing to the said medium.

5. Device according to claim 4, characterized in that said heads are magnetic heads furnished with air-gaps.

6. Device according to claim 4, characterized in that said heads and said medium form a write/read system of magneto-optical type.

7. Device according to claim 1, characterized in that the write addressing of the said memory is incremented image by image, as is the read addressing;

the disparity between the write and read addresses being modified by several units so as to change the value of the said deferment in one direction and then in the opposite direction, unit by unit, at a rate which is a sub-multiple of the rate of reading of the said images, so as to return to the initial disparity.

8. A device for deferring transmission of a sequence of moving images, said device comprising:

write addressing circuitry for incremental writing on an image by image basis of said sequence of moving images to a buffer memory wherein said buffer memory has sufficient capacity to contain several of said images;

read addressing circuitry for reading said images in said buffer memory wherein said read addressing circuitry is incremented image and wherein said read addressing of said sequence of moving images is deferred from said write addressing and wherein said deferring has a deferment value which is subject an abrupt change on a request followed by an automatic and gradual return to an initial deferment value;

wherein a disparity between said read and write addressing is modified by a plurality of units in order to change the value of the said deferment in one direction and then in the opposite direction, image unit by unit, at a rate which is a sub-multiple of the rate of reading of said images, so as to return to an initial disparity.

9. Device according to either one of claims 8 or 1, characterized in that said buffer memory is a microprocessor-managed random access memory.

10. Device according to claim 9, characterized in that the signals representative of the said images are subjected to a compression processing prior to their writing to the said memory and in that the signals resulting from the reading of said memory undergo an inverse processing before being applied to the said display means.

11. Device according to either one of claims 8 or 1, characterized in that a non-deferred source signal is used in a phase of normal operation, whilst means are provided for substituting it with the deferred source signal in a transient phase ending in the resumption of said normal operation.

12. Device according to either one of claims 8 or 1, characterized in that said buffer memory is a semiconductor memory.

13. Device according to claim 12, characterized in that said memory can be extended by adding modules.

* * * * *